United States Patent [19]

Bumb, Jr. et al.

[11] 3,916,443

[45] Oct. 28, 1975

[54] MAGNETIC TAPE DRIVE APPARATUS

[75] Inventors: Frank C. Bumb, Jr., San Gabriel; Harold Johnson, Sherman Oaks, both of Calif.

[73] Assignee: California Data Machines, Van Nuys, Calif.

[22] Filed: Apr. 25, 1972

[21] Appl. No.: 247,299

[52] U.S. Cl. .................... 360/96; 360/71; 360/105; 360/130

[51] Int. Cl.$^2$ ............................................ G11B 5/54

[58] Field of Search ................ 360/96, 71, 105, 130

[56] References Cited

UNITED STATES PATENTS

| | | | |
|---|---|---|---|
| 3,620,429 | 11/1971 | Kozu et al. | 360/105 |
| 3,659,806 | 5/1972 | Crafts | 360/96 |
| 3,716,242 | 2/1973 | Maruyama | 360/105 |
| 3,800,323 | 3/1974 | Jenkins | 360/96 |
| 3,821,810 | 6/1974 | Maruyama | 360/96 |

*Primary Examiner*—James W. Moffitt
*Attorney, Agent, or Firm*—William W. Haefliger

[57] ABSTRACT

A transport for magnetic tape carried by a cartridge element having a case with an edge aperture for exposing the tape to contact with a read/write head, and tape reels rotatable within the case; the transport comprising:

a. deck structure to removably support the cartridge element,
b. a tape engaging magnetic head element
c. a tape engaging pressure roller element,
d. a single tape driving rotary capstan element and a bi-directional drive carried by the deck structure to rotate said capstan element alternately clockwise and counterclockwise,
e. a carrier on the deck structure for effecting displacement of said head and pressure roller elements relative to the capstan element to engage and disengage the pressure roller and head with the exposed tape, and
f. one or both reels receiving torque application to tension the tape extent to be driven by the capstan elements when the head and pinch roller elements are displaced into engagement with the tape.

16 Claims, 11 Drawing Figures

MAGNETIC TAPE DRIVE APPARATUS

BACKGROUND OF THE INVENTION

This invention relates generally to digital, magnetic tape transports wherein the tape is carried in cartridges such as casettes. More particularly it concerns improvement in such transports enhancing simplicity and reliability while retaining high performance, and characterized by lower cost.

As contrasted with audio tape transports, digital transports require fast and repeatable stop-start characteristics; bi-directional operation; low edge wear on the tape for several thousand passes of the tape past the magnetic head; low error rates and high reliability; multiple tape speed drive capability (for reading, writing and searching modes of operation); and remote operation capability.

Conventional attempts to meet the above requirements have resulted in the provision of transports having multiple continuously running capstans with alternately engaged pressure rollers for bi-directional operation, and the capstans being either continuously running and having fast actuating pinch rollers, or characterized as being fast response servo driven. It is clear that the use of multiple capstans imposes undesirable expense particularly in cassette tape transports of relatively small size.

Additional disadvantages associated with conventional digital type cassette tape transports include: skewing of the tape as well as excessive tension transients when pinch rollers are engaged and disengaged, and undesirable head wear and tape tension resulting from the action of different cassette pressure pads on the tapes engaging the head. As the tape travels over the head, it wears a minute groove, and subsequent cassette tapes tend to follow in that groove unless imposed forces cause travel in a different path. Various cassette pressure pads having differences in pressure distribution can cause such a change in path with resultant instability in tape motion over the head. Since the wear pattern from several cassettes may favor one path, the movement of a subsequent cassette tape over the head in a slightly different path can result in unstable tape motion. Also, pressure pads conventionally vary in pressure by a ratio of up to three to one, which results in a variation in tape tension on take-up reels as well as undesirable head wear. With the tape edge abrasion that can occur from the tape riding the edge of a guide, and from this high variation in tension, the tape may wrap on the reel in a slightly conical pattern and jam between the inner walls of the cassette case. These problems are acutely aggravated where cassette tapes are subjected to fast stop and start modes of operation as in digital transport applications.

SUMMARY OF THE INVENTION

It is a major object of the invention to provide a digital tape transport for use with standard Philips cassettes or similar cassettes or cartridges for magnetic tape, and characterized as overcoming the above as well as other problems encountered in such usages.

The environment of the invention consists of a transport for magnetic tape carried by a cartridge element which includes a case having an aperture along the edge thereof for exposing tape to contact with a read/write head, and tape reel means rotatable within the case. Such a cartridge may advantageously take the form of a tape cassette having openings to receive drive posts to which torque is supplied for application to a pair of tape reels in the cassette.

In this environment the invention is basically embodied in deck structure to removably support the cartridge element; a tape engaging magnetic head element; a single tape driving rotary capstan element and means to rotate the latter alternately clockwise and counterclockwise for bi-directional operation; displacement means (as for example a carrier plate) carried by the deck structure for effecting displacement of the head and pressure roller elements relative to the capstan element to engage and disengage the head and pressure roller with the exposed tape; and means to apply torque to the reel means to tension the tape extent driven by the capstan and engaged by the head and pressure roller. As will be seen, the torque applying means may include a pair of motors energized to apply clockwise torque to one reel and counterclockwise torque to the other reel, thereby to develop the required tape tension for bi-directional operation; and the capstan drive may be servo-controlled.

Further objects of the invention include the provision of tape edge guide structure of the head and pressure roller elements; the adjustment mounting of the capstan drive to the deck structure so as to enable precision guiding of the tape relative to the head during bi-directional operation; the provision of an actuator to displace the carrier plate toward the cassette, with precision guiding of that plate during its movement; and the provision of locating means for accurately locating the carrier plate relative to the deck structure and characterized in that at least a portion of the carrier undergoes displacement normal to the deck structure during final displacement of the carrier plate to advanced position.

Additional objects include the provision of a spring on the carrier to yieldably and controllably urge the pressure roller against the tape; pivoted arm support the pressure roller, the arm yieldably urged by the spring so as to urge the pressure roller toward the capstan; and means on the deck structure to sense passage of reference indicia on the tape, such means including posts projecting through the carrier plate.

Unusual advantages include absence of need for mechanical clutches, belts or brakes, design simplicity and low maintenance achieved by direct drive of the capstan and reel motors; high data accuracy and tape tension control resulting from the velocity controlled capstan bi-directional drive; and flexibility of bi-directional read/write, as at multiple speeds (for example, between 2 and 12 inches per second, this being illustrative only).

These and other objects and advantages of the invention, as well as the details of an illustrative embodiment, will be more fully understood from the following description and drawings, in which:

DRAWING DESCRIPTION

Figure 1:
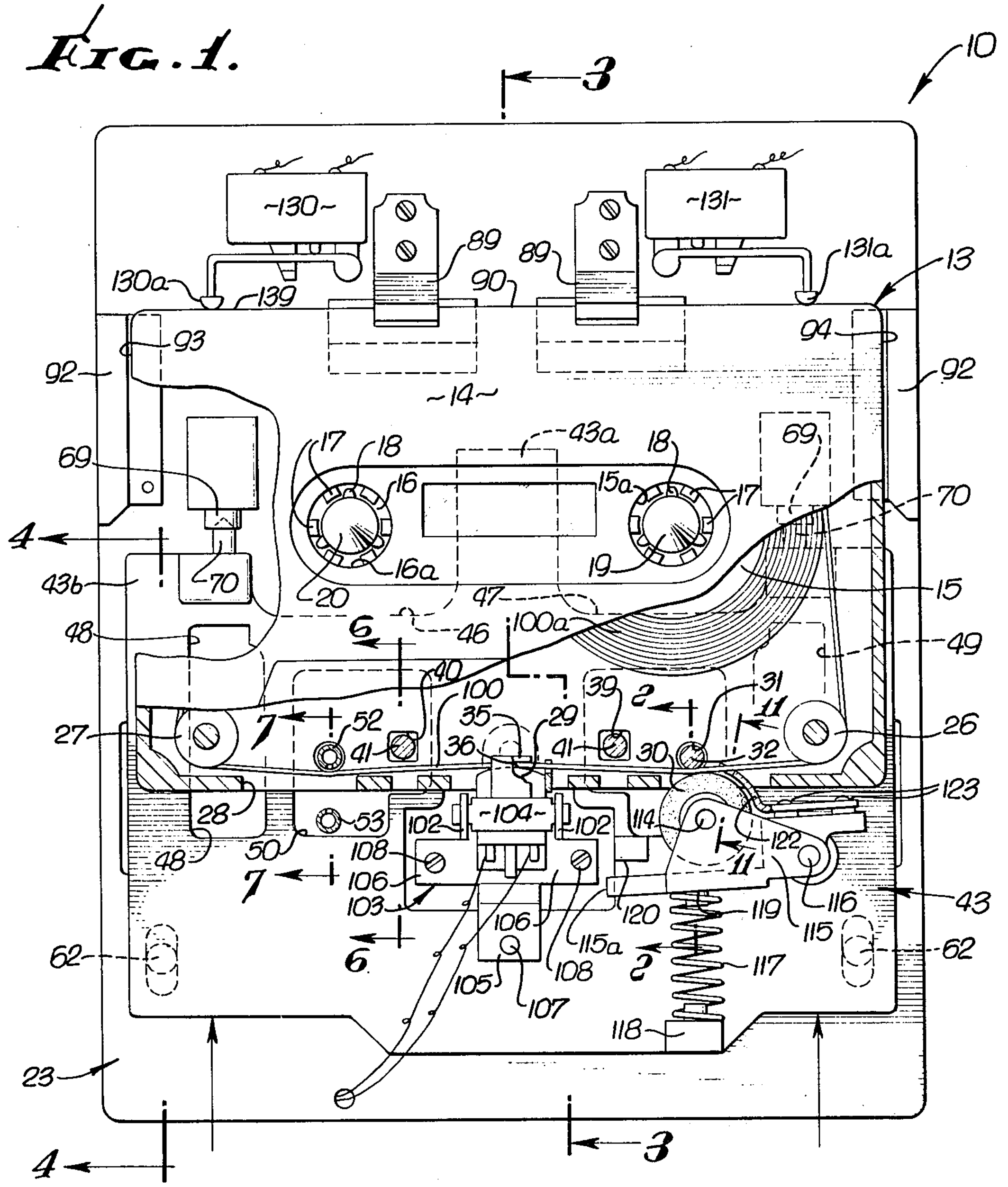
FIG. 1 is a top plan view of a cassette tape transport embodying the invention, with a cassette shown in inserted position.
Figure 10:
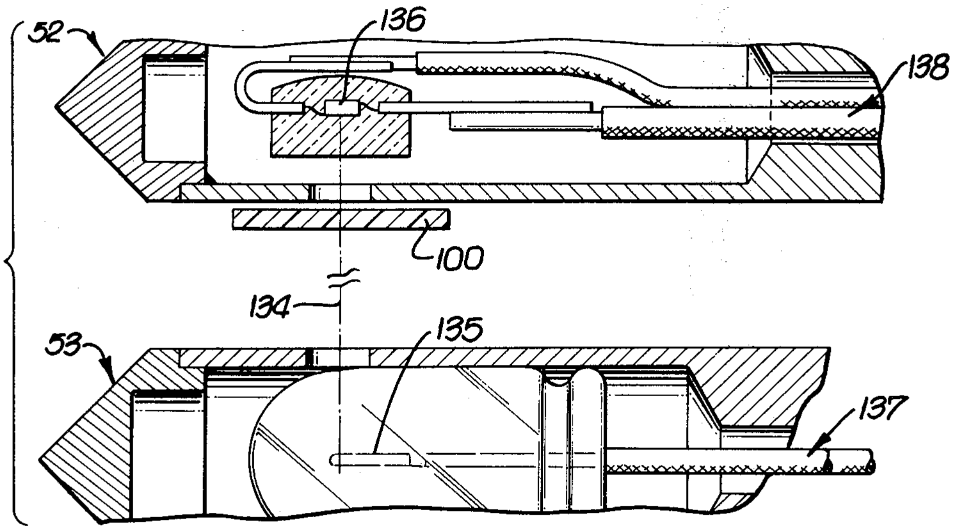
Figure 9:
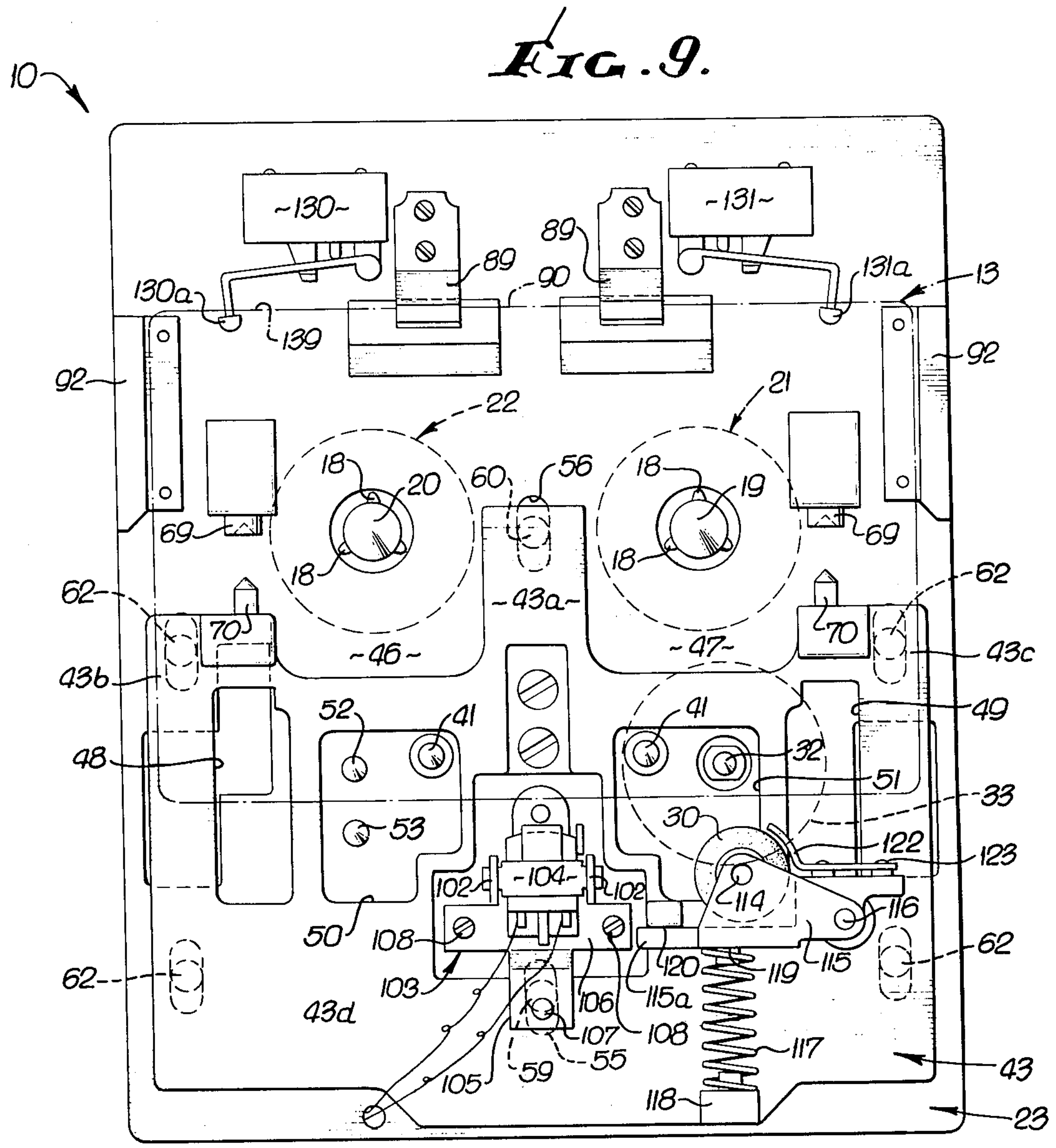
Figure 7:
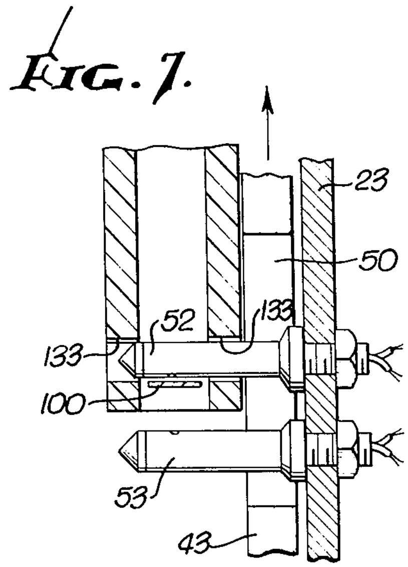
Figure 8:
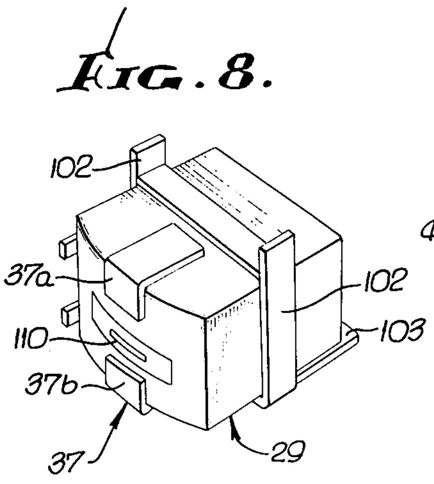
Figure 6:
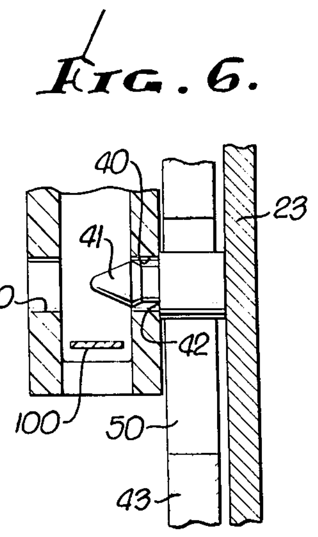

FIGS. 6 and 7 are enlarged fragmentary sectional elevations taken on lines 6—6 and 7—7 of FIG. 1, respectively;

FIG. 8 is a perspective view of the magnetic head seen in FIG. 1;

FIG. 9 is a view like FIG. 1, but showing the transport with the cassette removed;

FIG. 10 shows end-of tape sensor construction; and

Figures 2, 11:
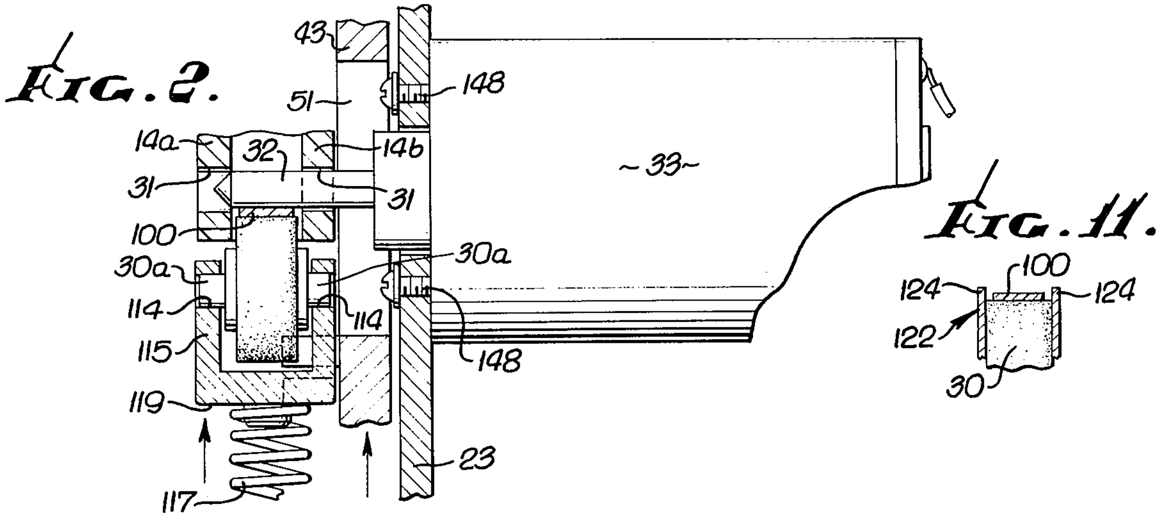
FIG. 2 is an enlarged sectional elevation taken on lines 2—2 of FIG. 1.

FIG. 11 is a section on lines 11—11 of FIG. 1.

DETAILED DESCRIPTION

In accordance with the invention, the transport 10 as seen in FIG. 1 is adapted for uses with a magnetic tape cartridge. The latter broadly includes a case having an aperture along its edge for exposing magnetic tape to contact with a read/write head 29. One example of such a cartridge is the Philips-type tape cassette 13 shown in FIGS. 1, 3, 6 and 7 and including a hollow case 14 having upper and lower case sections 14*a* and 14*b* which are suitably attached together. Mounted in the case for rotation are a pair of winding reels 15 and 16 forming central openings 15*a* and 16*a* into which lugs 17 on the reels project inwardly. The lugs 17 interfit lugs 18 on driving posts 19 and 20 driven by rotary motors 21 and 22 carried by the transport frame plate 23. During operation of the transport, the posts drive the reels at differential velocities to tension the tape being transported between windings 100*a* and 100*b* on the respective reels 15 and 16.

Also contained within the case 13 are two idler rollers 26 and 27 about which the tape travels during advancement in either direction. Note that the case has an elongated opening 28 along one edge to expose the tape extent 100 traveling lengthwise between the rollers. When the cassette is mounted in the position shown, the tape extent 100 is exposed to magnetic read/write head 29 and to a pressure or pinch roller 30 carried for engagement with the tape as will be explained. Aligned openings 31 in the case are adapted to receive the shaft 32 of rotary capstan means, which also includes a drive motor 33 carried at the underside of frame plate 23. Shaft 32 effects tape advancement in either direction when the pressure roller 30 urges the tape into non-slip engagement with the capstan shaft, the motor 33 being servo-controlled, as for example is described in U.S. application for Letters Pat. Ser. No. 144,901, filed May 19, 1971 by Harold Johnson and now U.S. Pat. No. 3,708,737, in order to precisely control the angular velocity of the shaft and the advancement velocity of the tape, for digital data transfer between the head and tape.

Figure 3:
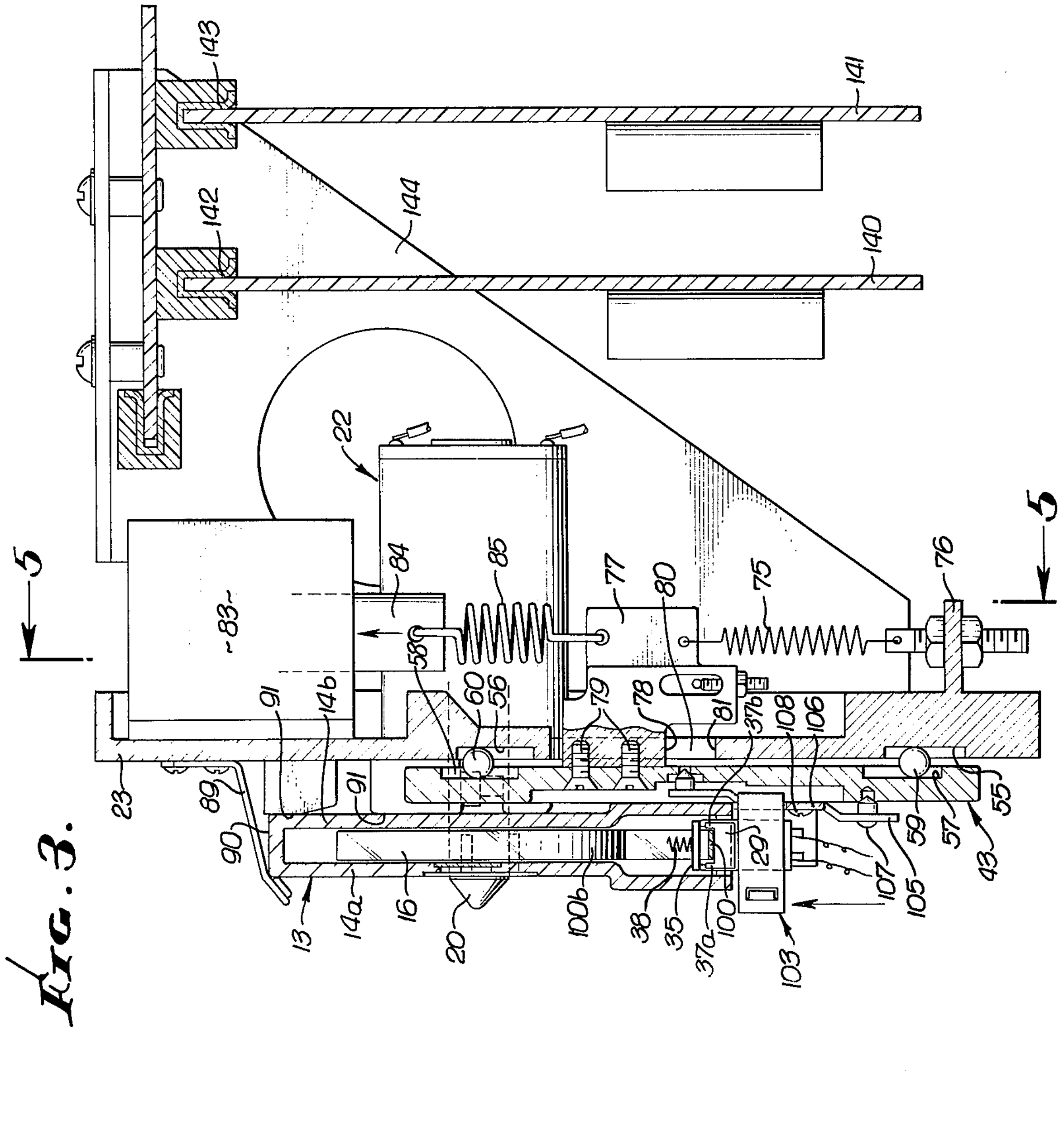
FIG. 3 is a sectional elevation taken on lines 3—3 of FIG. 1.

A spring urged support or pressure pad 35 is provided in certain cassettes inwardly of the tape and opposite the magnetic head 29, the pad being carried by the cassette and typically consisting of a piece of soft felt. Provision is made, in accordance with the subject matter of U.S. Pat. application Ser. No. 183,205, filed Sept. 23, 1971 by Frank C. Bumb, Jr. and now U.S. Pat. No. 3,777,070, for freeing the tape from engagement with the pad when the front surface 36 of the head engages the tape. Thus, as seen in FIGS. 3 and 8, a spacer 37 having upper and lower sections 37*a* and 37*b* is carried by the head to project forwardly above and below the tape and deflect the pad forwardly away from the tape, a spring 38 resisting such pad displacement. Finally, two pairs of aligned openings 39 and 40 are formed in the case to receive posts 41 for locating and locking the cassette in inserted position spaced above the frame plate or deck 23, as seen in FIGS. 1 and 6. Shoulders 42 on the posts face upwardly to engage and seat the cassette case, thereby maintaining a predetermined spacing of the cassette from plate 23 in order to provide for accurate registration of the tape with respect to the head 29, and tolerancing of the cassette relative to a displacement means, for example in the form of carrier 43 for the head 29 and pinch roller 30.

The precision carrier 43 has guiding and locating functions which are of substantial importance to the successful operation of the transport, especially for digital applications. The carrier may with unusual advantage take the form of a plate, as shown, with forward sections 43*a*, 43*b* and 43*c*, which are spaced apart at 46 and 47, and a rearward section 43*d* extending laterally in interconnecting relation with sections 43*a*, 43*b* and 43*c*. Spaces 46 and 47 are in rearward alignment with the drive posts 19 and 20, section 43*a* projecting between the posts in fully advanced position of the carrier plate as seen in FIG. 1. The plate also contains cut-outs 48–51, the cut-out 51 passing capstan shaft 32 and cassette locating post 41 in all positions of the carrier, and cut-out 50 passing locating post 41 and optical sensor posts 52 and 53 in all positions of the carrier.

The carrier plate is precisely oriented during its movement between retracted (FIG. 9) and advanced (FIG. 1) positions, as by bearing means on the deck structure and on the carrier. The unusually advantageous example of such bearing means is seen in FIGS. 3 and 9 to include longitudinally extending ways 55 and 56 in the frame plate or deck 23, longitudinally extending ways 57 and 58 in the carrier plate 43, and bearing balls 59 and 60 respectively engaging ways 55 and 57 and ways 56 and 58. Such ways may be formed as grooves having V-shaped cross sections in planes normal to the longitudinal direction of carrier plate displacement.

Figure 4:
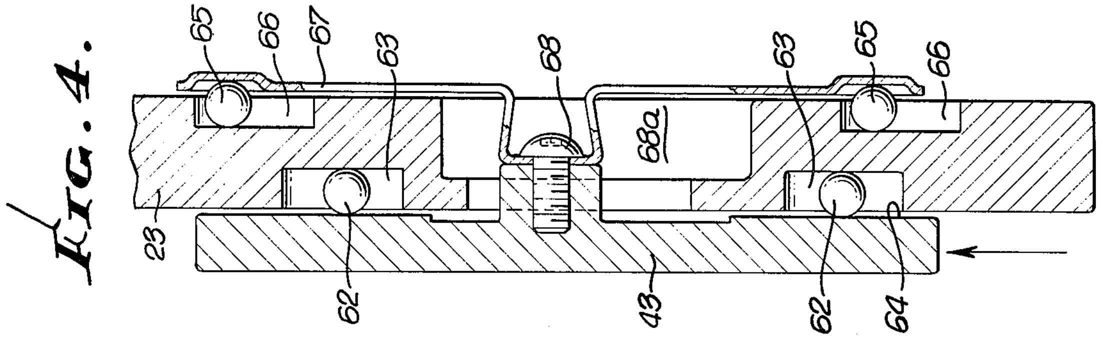
FIG. 4 is an enlarged sectional elevation taken on lines 4—4 of FIG. 1.

Further, attachment means is provided to yieldably retain the carrier plate attached to the frame plate, there also being locating means for accurately locating the carrier relative to the deck structure characterized in that at least a portion of the carrier undergoes displacement relatively normal to the deck structure (as accommodated by the yieldable attachment means) during final displacement of the carrier to advanced position. This assures that the head 29 on the carrier (as well as pressure roller 30 and guide 122 to be described) will always be advanced into predetermined position relative to the deck despite bearing tolerances, the tape carrying cassette itself having been releasable locked into predetermined position relative to the deck, whereby the head and guides are accurately located relative to the tape exposed extent 100. Such attachment means may take the unusually advantageous form shown in FIGS. 4 and 9 by one or more bearing balls 62 riding in one or more longitudinal grooves 63 in frame plate 23, the balls 62 engaging the underside 64 of carrier plate 43 to maintain it spaced from frame plate 43. Such spacer balls may be located at four positions as seen in FIG. 9. The carrier plate 43 is urged toward frame plate 23 as by the yieldable spring arms 67 connected at 68 to the plate 43 and projecting within an opening 68*a* in plate 23 and longitudinally therebeneath. The arms are tensioned by balls 65 riding in longitudinal grooves 66 formed in the underside of frame plate 23, the arms retaining those balls in the grooves.

The referred to locating means may be positioned on the frame plate or deck and on the carrier plate to interengage in response to forward displacement of the carrier plate to advanced position (carrying the head and pressure roller into engagement with the tape), so as to accurately locate the carrier plate relative to the frame plate. Such locating may with unusual advantage be characterized in that a portion, at least, of the carrier plate undergoes slight displacement relatively normal to the deck structure, as accommodated by flexing of attachment arms 67, during first displacement to advanced position. For this purpose, tongue and groove elements such as conical pilot sockets 69 carried by the plate 23 and conically tipped locating pins 70 on carrier plate 43 may interengage as seen in FIG. 1 at two laterally spaced locations forwardly of the cut-outs 48 and 49. This interengagement serves to slightly shift the carrier plate out of guided relation with the anti-friction bearings to eliminate the mis-guiding effects of any bearing looseness due to production variations in design tolerances.

Figure 5:
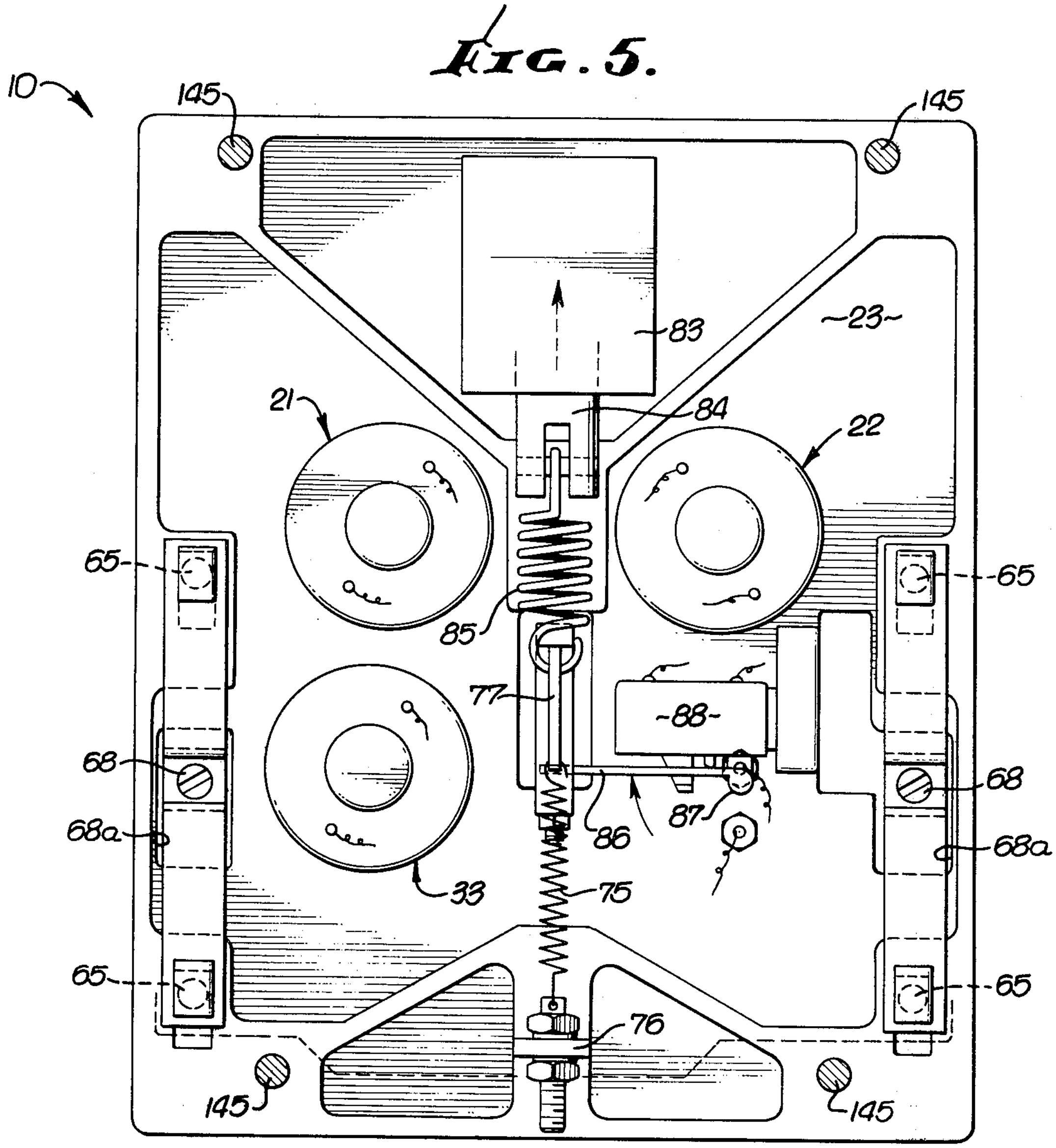
FIG. 5 is a bottom plan view of a cassette tub taken on lines 5—5 of FIG. 3.

The carrier plate is maintained in retracted or unloaded position by a longitudinal return spring 75 connected between the frame at 76 and a bracket 77. The latter is attached to the carrier by fasteners 79 and projects downwardly through an opening 80 in the plate 23. In fully retracted condition, a rear shoulder 78 of the bracket engages a stop shoulder 81 presented by the plate 23. A solenoid 83 having a plunger 84 operates to pull the plate 23 forwardly to fully advanced position, when energized. A preloaded (tightly wound) extension spring 85 serves as a link between the plunger 84 and the bracket 77, and allows the solenoid to seat by extending slightly at the end of the plunger stroke, which in turn allows a lower solenoid holding current. Referring to FIG. 5, a switch arm 86 pivotally carried at 87 by switch 88 is operated in response to forward displacement of the bracket. The switch functions to effect a reduction of the solenoid holding current below full actuating current level to lower power consumption and heating, as for example by connecting a lower voltage level supply circuit with the solenoid. Mechanical means may alternatively be used to hold the carrier plate in advanced position, so as to eliminate need for the holding current.

FIGS. 1 and 3 show the provision of spring fingers 89 which are tensioned in response to engagement with the forwardmost wall 90 of the cassette upon its insertion, and which act to clamp the cassette forwardly and into engagement with the previously mentioned seats or stops 42 provided by posts 41 and downwardly against lands 91. The upper extents of the posts are tapered as seen in FIG. 6 to guide the cassette into downwardly inserted position by engagements with the case walls defining the openings 40. Lands 91 upstanding from frame plate 23 also seat the cassette case, as is clear from FIG. 3. Also, upstanding side flanges 92 on the plate 23 closely confine the lateral sides 93 and 94 of the cassette case.

Referring to FIGS. 1, 3 and 9, it will be observed that the magnetic head 29 is adjustably mounted on the plate 43, so that it is not necessary that the head itself be formed with precise configuration. This allows economy in head manufacture, the head being one of the most expensive elements in the total system, and at times requiring replacement. As shown, the head is carried between arms 102 of a bracket 103, therebeing a cross-piece 104 extending over the top of the head between the arms. The bracket extends beneath the head, and has longitudinal and lateral legs 105 and 106 adjustably fastened at 107 and 108 to the plate 43, to control tilt of the head in sideward, frontward and rearward modes. FIG. 3 shows the spacer sections 37*a* and 37*b* carried by the head to extend above and below the tape, for edge-guiding same, with precision across the front face of the head better seen at 110 in FIG. 8.

The previously referred to pressure roller 30, which may include an elastomer outer annulus or coating, has trunnions 30*a* pivotally journaled or carried at 114 by an arm 115 which is in turn pivotally connected at 116 to carrier plate 43. See in this regard FIGS. 1 and 2. A compression spring 117 extends between a flange 118 as the plate and the arm at 119 to urge the arm in a direction urging the pinch roller generally forwardly to engage the tape 100 at the side thereof opposite the capstan 32. In retracted position of the plate 43, the pinch roller is disengaged from the tape, and an arm extension 115*a* engages a stop 120, maintaining the spring in compressed condition. In advanced position of the plate 43 as seen in FIG. 1, the arm is displaced counterclockwise to disengage extension 115*a* from stop 120 in response to pressure roller engagement with the tape, whereby the spring is positioned to yieldably and controllably urge the pressure roller against the tape, the latter in turn being urged against the capstan with pressure controlled for precision bidirectional drive. In this regard, the orientation of the capstan is adjustable (as by fasteners 118 and suitable adjustment screws in FIG. 2) during manufacture, allowing precise alignment in relation to the pinch roller and the edge guide associated therewith for best bidirectional performance and tape handling. Lack of the latter can cause damage to the edge-guided tape as well as reading errors.

Tape edge guide structure proximate the pressure roller may with unusual advantage take the form of a guide chute 122 seen in FIGS. 1 and 11 as extending part way about the pressure roller and anchored to arm 115 at 123. The chute has ears 124 straddling the tape closely approaching or leaving the pinch roller, for edge-guiding same. As a result desired tracking relative to the head is achieved, especially in driving the tape 100 to the left (reversely) in FIG. 1, so that bidirectional digital data handling capability is optimized.

Means is provided on the deck structure to optically secure passage of reference indicia on the tape 100 near the beginning and end of tape transport between the windings on the reels, a signal produced by such sensing for example being used to modify (for example stop) the drive of the capstan 32. One such means is seen in FIGS. 1, 7, 9 and 10 to include the mentioned pair of posts 52 and 53 mounted to frame plate 23 and projecting through cut-out 50 in carrier plate 43. In addition, post 52 projects through aligned openings 133 in the cassette case. A beam 134 of radiation, as for example light, generated at 135 in post 53, passes through the tape running adjacent post 52, for detection by a detector 136 (as for example a photo transistor) in post 52. Leads associated with the generator and detector are seen at 137 and 138.

Micro-switches seen at 130 and 131 in FIGS. 1 and 9 have arms 130*a* and 131*a* engagable by the cassette leading edge 139 upon insertion, to initiate suitable control circuitry.

In operation, the energized reel motors apply sufficient torque to the reels to tension the tape extent 100 being transported between the windings on the reels. For example, clockwise torque may be applied to the left reel 16 in FIG. 1, and counter-clockwise torque to the right reel 15. Such torque is sufficient to maintain the tape wrapped on the take-up reel during drive of the tape in either direction by the capstan drive, with tension always maintained in the tape extent 100 traversing the head. In this regard, the clockwise torque applied to reel 16 may approximately equal the counterclockwise torque applied to reel 15, so that the capstan drive conditions will remain approximately the same for bi-direction operation.

Further, the control circuitry associated with the capstan drive motor controls increases and decreases in the capstan angular velocity to be ramp functions of time; and, the capstan angular velocity is maintained constant between such ramps. Merely as illustrative, the control circuitty may be defined on the circuit boards or modular cards 140 and 141 shown as removably plugged into the terminals groups 142 and 143 in FIG. 3. The latter are carried on a bracket 144 attached to the frame plate 23 at 145, in FIG. 5.

The recording format may be single track, serial data, phase encoded at a packing density of about 800 bits per inch. Input and output format are logic level plus separate clock. Recorded trackwidth of .057 inches (for example) and inter-record gaps are compatible with proposed ECMA standards for cassette interchangeability. Incrementing may be achieved by internally generating a tape velocity ramp from zero to two inches per second (for example), writing a single character, and decelerating to zero velocity. A similar velocity profile is generated for interrecord gaps in synchronous operation.

Finally, it should be observed that the invention accommodates a cassette, as described, irrespective of which side of the cassette faces the deck.

We claim:

1. In a transport for magnetic tape carried by a cartridge element which includes a case having an aperture along the edge thereof for exposing tape to contact with a read/write head, and tape reel means rotatable within the case, the combination comprising a. deck structure to removably support the cartridge element;

b. a tape engaging magnetic head element c. a tape engaging pressure roller element, and tape edge guide chute structure adjacent the pressure roller element, d. a single tape driving rotary capstan element and means carried by the deck structure to rotate said capstan element alternatively clockwise and counterclockwise, e. displacement means carried by the deck structure and including a carrier for the head and pressure roller elements and also for the guide chute structure, for effecting displacement of said head and pressure roller elements relative to the capstan element to engage and disengage the pressure roller and head with the exposed tape, while the guide chute structure remains adjacent the pressure roller element, there being an actuator to displace the carrier toward the cartridge element, and f. means carried by the deck structure for applying torque to said reel means to tension the tape extent to be driven by the capstan elements when the head and pressure roller elements are displaced into engagement with the tape.

2. The combination of claim 1 wherein said capstan element rotating means includes a servo-controlled drive operable to rotate the capstan element bidirectionally.

3. The combination of claim 2 wherein said drive includes control circuitry to control increases and decreases in the capstan angular velocity to the linear ramp functions of time, and to control the capstan speed at selected level between said ramp functions.

4. The combination of claim 1 including means adjustably mounting the head element on the deck structure.

5. The combination of claim 1 including a spring positioned on the carrier to controllably and yieldably urge the pressure roller against the tape.

6. The combination of claim 5 wherein the pressure roller is carried by an arm pivotably mounted on the carrier and urged toward the capstan by said spring, the guide chute structure also carried by said arm to remain adjacent the pressure roller during arm and pressure roller pivoting.

7. The combination of claim 1 wherein the reel means includes a pair of tape reels rotatable within the case, and between which the tape is transported, said torque applying means including a pair of motors energizable to apply clockwise torque to one reel drive post, and counterclockwise torque to another reel drive post.

8. The combination of claim 7 defined by a tape cassette supported by the deck structure, the cassette case having openings to receive said posts operatively connected with the reels to control rotation thereof so as to tension the tape.

9. The combination of claim 8 wherein said cassette includes a pad normally urging the tape in a direction away from the interior of the cassette case, and there being pusher means carried by said displacement means for pushing the pad away from the tape in response to said relative displacement of the elements to engage the head and pinch roller with the tape.

10. The combination of claim 8 including means on the deck structure to sense passage of reference indicia on the tape near the beginning and ending of tape transport between said reels.

11. The combination of claim 1 including bearing means on the deck structure for guiding the carrier for said displacement, and through which force is transmitted acting to retain the carrier attached to the deck structure.

12. The combination of claim 11 including attachment means yieldably retaining the carrier attached to the deck structure, and locating means for accurately locating the carrier relative to the deck structure characterized in that at least a portion of the carrier may undergo displacement relatively normal to the deck structure, as accommodated by said attachment means, during final displacement to advanced position.

13. The combination of claim 11 wherein said bearing means includes ways extending in the direction of carrier displacement and there being balls on and guided by the ways to support and guide the carrier for said displacement.

14. The combination of claim 13 wherein certain of said ways are formed as longitudinally extending grooves in the deck structure and in the carrier, said grooves having V-shaped cross sections in planes normal to the longitudinal direction of carrier displacement.

15. In a transport for magnetic tape carried by a cartridge which includes a case having an aperture along the edge thereof for exposing tape to contact with a magnetic head, and the reel means rotatable within the case, the combination comprising a. deck structure to removably support the cartridge,
b. a tape engaging magnetic head,
c. a tape engaging pressure roller,
d. a single tape driving rotary capstan and means to rotate said capstan alternately clockwise and counterclockwise, and
e. displacement means carried by the deck for effecting longitudinal displacement of the head and pressure roller relative to the capstan to engage and disengage the pressure roller and head with the exposed tape, said means including a carrier plate carrying the head and pressure roller, linear bearings guiding the plate for said displacement between advanced and retracted positions, and tapered locating means on the deck structure and carrier plate and interengageable to limit plate advancement in said advanced position and simultaneously to block deflection of the plate normal to the direction of plate advancement in said advanced position, there being flexible means operatively connected between the plate and deck to yieldably resist said plate deflection, and the plate being deflected relatively away from the deck in advanced position of the plate.

16. In a transport for magnetic tape carried by a cartridge which includes a case having an aperture along the edge thereof for exposing tape to contact with a magnetic head, and tape reel means rotatable within the case, the combination comprising a. deck structure to removably support the cartridge,
b. a tape engaging magnetic head,
c. a tape engaging pressure roller,
d. a single tape driving rotary capstan and means to rotate the capstan alternately clockwise and counterclockwise,
e. a carrier carried by the deck for effecting longitudinal displacement of the head and pressure roller relative to the capstan to engage and disengage the pressure roller with the tape at the side thereof opposite the capstan,
f. an arm pivotally mounted by the carrier and supporting the pressure roller for rotation, and a spring urging the arm in a direction carrying the pressure roller toward said capstan,
g. there being linear bearings guiding the plate for said displacement, flexible means operatively connected between certain of said bearings and the plate to yieldably resist deflection of the plate relatively away from the deck during said displacement, and there being locating means on the deck and plate and interengaged to deflect the plate relatively away from the deck when the pressure roller engages the tape.

* * * * *